June 18, 1963 W. S. HUMPHREY, JR., ETAL 3,094,610

ELECTRONIC COMPUTERS

Filed June 2, 1959 5 Sheets-Sheet 1

INVENTORS
W. S. HUMPHREY JR.
J. TERZIAN
F. M. BOSCH

BY F. L. Sullivan

ATTORNEY

INVENTORS
W. S. HUMPHREY JR.
J. TERZIAN
F. M. BOSCH
BY F. J. Sullivan
ATTORNEY

INVENTORS
W.S. HUMPHREY JR.
J. TERZIAN
F.M. BOSCH
BY F. L. Sullivan
ATTORNEY

INVENTORS
W. S. HUMPHREY JR.
J. TERZIAN
F.M. BOSCH
BY F. J. Sullivan
ATTORNEY

INVENTORS
W.S. HUMPHREY JR.
J. TERZIAN
F. M. BOSCH
BY F. L. Sullivan
ATTORNEY

United States Patent Office 3,094,610

Patented June 18, 1963

3,094,610
ELECTRONIC COMPUTERS

Watts S. Humphrey, Jr., Cochituate, John Terzian, Woburn, and Franz M. Bosch, North Billerica, Mass., assignors to Sylvania Electric Products Inc., a corporation of Delaware Filed June 2, 1959, Ser. No. 817,531
4 Claims. (Cl. 235—157)

This invention is concerned with electronic data processing equipment, and particularly with computers.

Copending U.S. Patent Application Serial No. 755,565, filed August 18, 1958, now Patent No. 3,061,192, discloses a high speed general purpose computer of considerable versatility, i.e. one which may be used for scientific calculations, record keeping, automated controls, etc. This computer features a random access memory, a control system, a multi-register arithmetic unit, an input-output system, and a number of auxiliary registers, all cooperating to process data under the control of an operating program. Such an arrangement is highly satisfactory from the viewpoint of performance, but shares the common economic burden of other satisfactory general purpose data processing equipment in that it requires a considerable amount of complex and expensive electronic equipment to give it the flexibility and versatility necessary for truly general purpose applicability.

A primary object of the present invention is to provide a computer of comparable capability and versatility at less expense in dollars and equipment. Another objective is to make this improved computer compatible programwise with the more expensive parent machine so that an overall data processing network may include central equipment, of the general type disclosed in the referenced patent application, and a number of auxiliary installations less ambitious in speed but with the same general capability, and workable by the same programs, as the central equipment. This will make it possible for large business, Government, or military organizations, which have invested considerable effort and funds in reorganizing and programming their headquarters operations and procedures to make them more compatible with electronic data processing, to realize a greater return on their investment by using the same programs with more modest equipment in lower echelon units.

Another object of the invention is to provide a computer having a capability for automatic performance of sub-routines so that it may be made compatible programwise with other equipments and have the characteristics of its performance altered at will by expanding or altering its subroutine sequences.

A further object is to provide improved electronic data processing equipment and techniques for operating it.

These and related objectives are accomplished in one embodiment of the invention by providing a computer having the following principal components: a random access memory; a memory register; a control register; an instruction register; an input-output system; and, a timing-control system. This computer substitutes locations in memory for the various auxiliary registers of more elaborate equipment and uses the memory and control registers in combination as a substitute for the extensive arithmetic and control units of more complicated machines. In addition, under the control of specialized built-in micro instructions and automatic subroutines, this equipment may be made compatible with the operating programs of more complex and expensive machines without requiring intermediate programming or computation.

Other objectives, features and modifications of the invention will be apparent from the following description of an illustrative embodiment thereof, and reference to the accompanying drawings, wherein.

Figure 1:
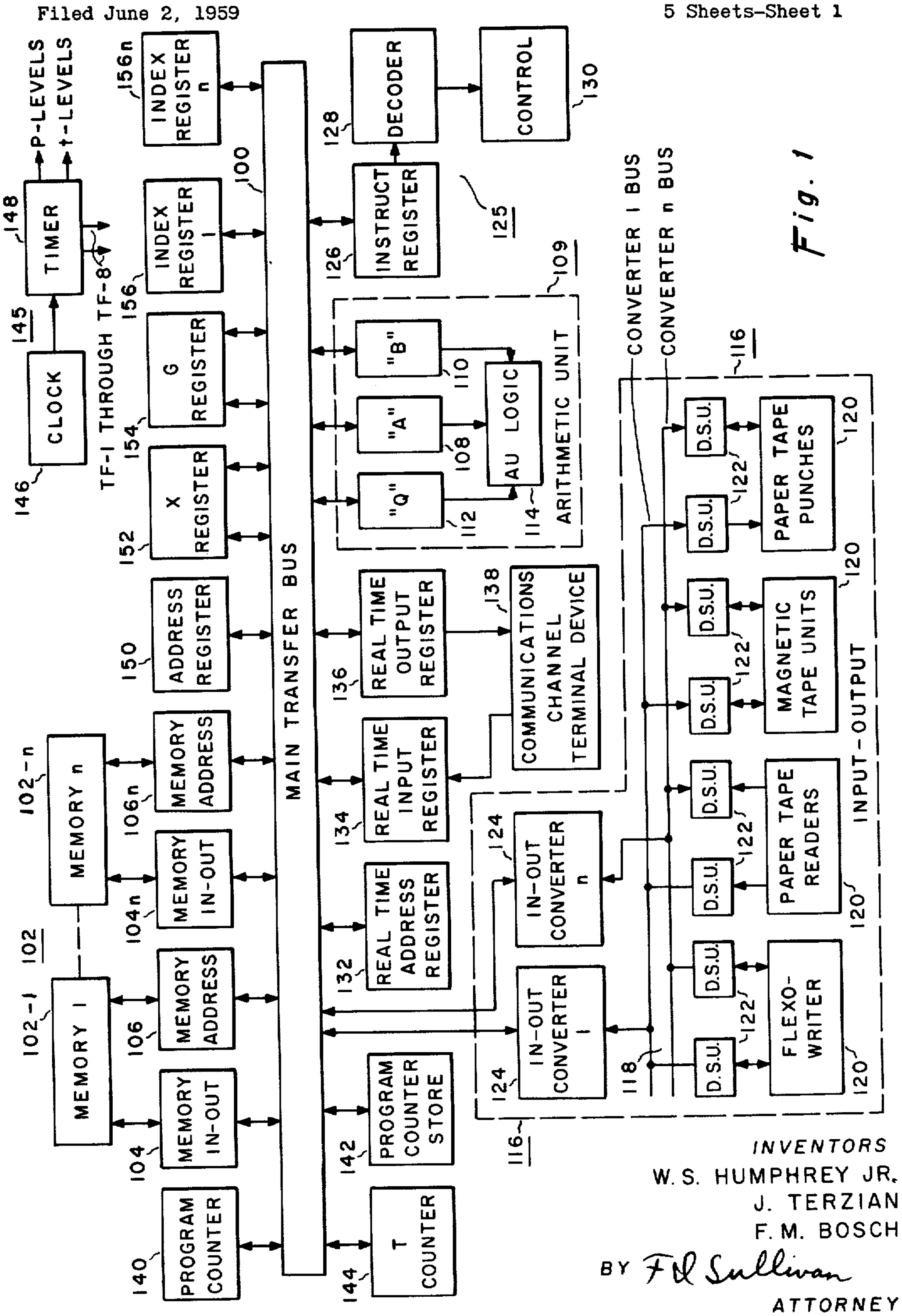
FIG. 1 is a block diagram of a representative general purpose computer.

The computer diagrammed in FIG. 1 is a high speed digital equipment adapted to process data in a manner described in the previously referenced patent application. All of the principal components of this computer are connected to a Main Transfer Bus 100 which comprises a separate conductor for each one of the information bits of the data word. These components include: a Memory System 102 having a plurality of Memory Units 102—1 etc., each of which is connected to the bus 100 via a Memory In-Out Buffer 104 and a Memory Address Register 106; an Arithmetic Unit 109 comprising an "A" Register 108, a "B" Register 110, a "Q" Register 112, and a Logic Control Unit 114; an Input-Output System 116 comprising an Input-Output Converter Bus 118, to which are connected a number of Input-Output Devices 120 via Device Switching Units (DSU) 122 and Input-Output Converters 124 which accept, process and transfer data between the Converter Bus 118 and the Main Transfer Bus 100; a Control System 125, including an Instruction Register 126, a Decoder 128, and a Control Unit 130; a Real Time System, including a Real Time Address Register 132, an Input Register 134, an Output Register 136, and a Real Time Terminal Device 138 such as a communications channel terminal equipment; a Program Counter 140, and a Program Counter Store 142; a T Counter 144, which functions as part of the Control System 125; Timing System 145, including a Clock 146 and a Timer 148; and, a plurality of Auxiliary Registers such as an Address Register 150 (to hold the address of an operand while it is modified), an X Register 152 (for double addressing), a G Register 154 (for auxiliary indexing purposes), and Index Register 156.

In the interest of brevity, a detailed explanation of the structure of these components and the manner in which they operate will be omitted here. The referenced application may be consulted for details, and those features which are pertinent to the present invention will be referred to for purposes of comparison during the following description of one embodiment of the present invention.

Figure 2:
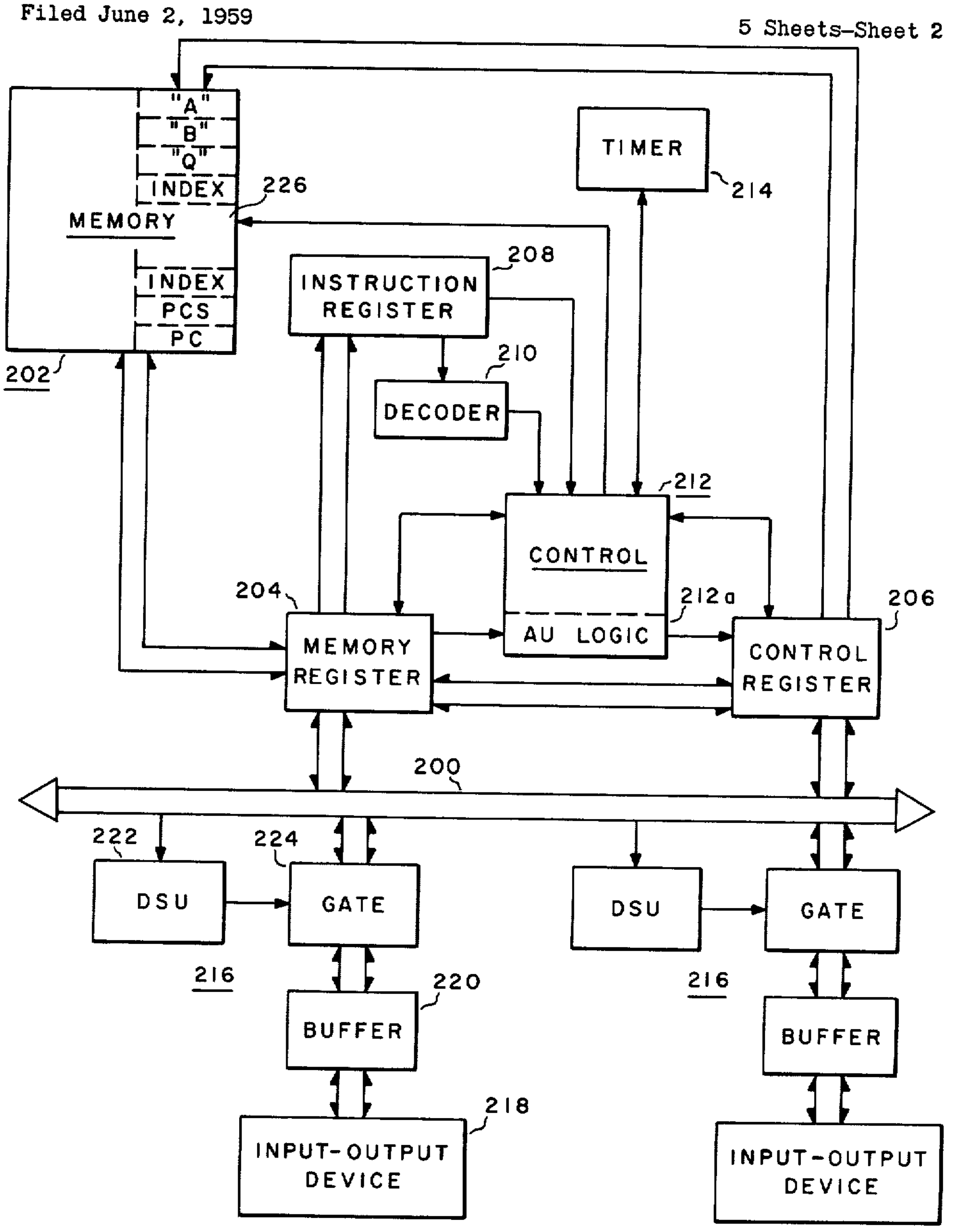
FIG. 2 is a block diagram of a computer embodying the invention.

The computer system diagrammed in FIG. 2 is a synchronous digital equipment like the computer of FIG. 1 and is capable of processing the same data in accordance with the same program and with the same versatility as that computer. It does operate at a somewhat slower speed but invloves considerably less equipment. Its principal components include: a Main Transfer Bus 200; a random access Memory Unit 202; a Memory Register 204; a Control Register 206; an Instruction Register 208; a Decoder 210; a Control System 212 including AU Logic **212*a*; a Central Timer 214; and, a plurality of input subsystems 216, each (for example) including an Input-Output Device 218, a Buffer 220, a Device Switching Unit 222, and a Control Gate 224**.

The Memory Unit 202 may be of the high speed, random access, magnetic core type described in copending U.S. Patent applications Serial Nos. 679,967 (August 23, 1957) now Patent No. 3,058,096 and 727,602 (April 10, 1958). Also, in order to be compatible with the computer system of FIG. 1, this memory must have capacity for storage of the same length data word, i.e. thirty-eight bits, providing for thirty-seven bits of binary information plus a parity check.

The Memory Register 204 may be a thirty-eight bit buffer-type storage register with a shifting capability. It is used as both a memory input and memory output device, doubles in use as an arithmetic register during execution of the programmed instructions, and six of its digits (e.g. $MR_{31-36}$) may be connected to the Instruction Register 208. The Memory Register 204 acts in a conventional manner, as described in the two patent applications referenced in the preceding paragraph, in transferring data into and out of the Memory 202. Briefly, it holds thirty-eight bits of binary data in its thirty-eight stages during a "write-in" cycle and each stage is connected, in a conventional manner by way of gating circuits, to the Z driver of a corresponding memory plane so that when a particular memory address is energized by the Control Register 206 (in a manner to be explained later), a binary ONE will be written into the addressed bit location of those memory planes whose Z drivers are connected to those stages of Memory Register 204 which contain a binary ONE and the addressed bit of those planes whose Z drivers are connected to a stage of Memory Register 204 which is in binary ZERO condition will be left in the ZERO state.

On the "read-out" cycle, again in conventional manner as explained in the referenced patent applications, the sense amplifier of each memory plane is connected to a corresponding one of the thirty-eight stages in Memory Register 204 by means of conventional gating circuits. Thus, when a particular memory address is energized for read-out by the Control Register 206, if the particular storage core energized in any memory plane experiences flux reversal to indicate that it had held a binary ONE in storage, its particular sense amplifier will set a corresponding stage of the Memory Register 204 to ONE condition. On the other hand, the sense amplifiers connected to memory planes whose addressed cores do not experience flux reversal will leave the stages of the Memory Register 204 to which they are connected in a binary ZERO condition.

In addition to acting as a memory input-out data transfer register, the Memory Register 204 may be connected to arithmetic control circuitry 212*a* in the same general manner that the "B" register in the arithmetic unit of FIG. 1 is connected to its implementing circuits and other "B" registers are connected in other conventional arithmetic units to their arithmetic control circuits. Also, six of its stages (i.e. those which correspond to the operation code of the system instruction word) may be connected over a conventional six parallel channel data transfer bus to the Instruction Register 208.

Thus, the single register 204 functions as a memory input register, a memory output register, the "B" register of an arithmetic unit, and as an instruction transfer register.

The Control Register 206 may be a thirty-seven bit shifting register. It serves the purpose of the accummulator in other computers through the implementation of conventional accumulator control circuits such as those employed for the "A" Register 108 of Arithmetic Unit 109 in the computer of FIG. 1 or the similar accumulator control circuitry of any other conventional computer. In addition, the first twelve bits, i.e. the least significant, are used in the system under description as a memory address register during access to the Memory 202, thus serving the same function as the Memory Address Register 106 in the computer of FIG. 1.

The Instruction Register 208 may be a six bit storage device connected to the Memory Register. It is used to hold the instruction under execution by the computer. In the illustrative system under description, this data may be derived from the Memory Register 204.

The Decoder 210 is a logical circuit network which decodes the instruction stored in the Instruction Register 208 and energizes the appropriate control circuits to implement execution of the operations specified.

The control subsystem 212 includes the logical circuits to control the so-called "micro-instructions" which are required to accomplish the detailed operations programmed for the computer.

The Timer 214 generates and distributes clock and timing pulses throughout the system.

In addition to the major component subsystems described above, the computer system of FIG. 2 has, as a special feature, a block 226 of locations in the Memory 202 reserved for special purposes. These serve the function and take the place of several of the auxiliary registers and the arithmetic registers of the computer of FIG. 1. They include the Program Counter (PC), the Program Counter Store (PCS), some of the functions of the "A," "B," and "Q" arithmetic registers, the various Index Registers, etc. Each of these special memory locations is wired with appropriate AND, OR, etc. control gates to the Control System 212 in such a manner that they are automatically addressed and either provide or accept data, as required, to accomplish each programmed instruction. Moreover, it is possible to make access to these memory locations without previously loading their addresses in the Control Register 206 which functions as an address register in this system by providing in the Computer Control 212 a system of gated connections to the locations in Memory 226 required for the execution of a given instruction. When an instruction requiring such access is loaded into Decoder 210 these gated circuits disable the connections from Control Register 206 to the address decoder of the Memory 226 and energize, instead, gates which actuate the address desired. Also, as explained in the next paragraph, certain instructions when they are inserted in the Register 208 and decoded may provide for direct access to a selected address in the Memory 226 and initiate a subroutined program.

The computer under discussion is arranged to handle two classes of instructions, direct and subroutine. Direct instructions are extracted, indexed, decoded, and executed directly, giving the same results as though they were programmed in the computer of FIG. 1. Subroutined instructions are not executed directly by the computer. When such an instruction is decoded, control is automatically transferred to a fixed location in memory. From here, the instruction is automatically sequenced using a series of direct instructions stored in memory locations wired into the Control System in such a manner that their contents are automatically sequenced to the Memory Register as required without necessity for loading their addresses into the Control Register. Upon completion of the subroutine, control is automatically transferred back to the main program. In a system where direct instructions are executed in microsecond time intervals, the time required for execution of subroutine instructions may extend to the millisecond range.

The fact that the same instruction lists are usable in the computer system of FIG. 1 and in that of FIG. 2 makes it possible to run identical programs in both systems. Certain precautions must, however, be observed. For example, such programs should not use the block of special memory locations 226 in the system of FIG. 2 which have been reserved for specific purposes. Instruction time differences must also be considered in programs which rely on relative timing between in-out operations and arithmetic or logical computations in the central computer.

To prevent undue burdening of this description with matter within the ken of those skilled in the electronic data processing art, a block diagram approach has been followed with a functional description of each block and specific identification of the circuitry it represents. Also, flow charts for the addition and multiplication functions are provided. Thus, the individual engineer is free to select elements and components such as flip-flop circuits, shift registers, etc. from his own knowledge and experience, the referenced patent applications, and available standard references such as Switching Circuits With Computer Applications, Watt S. Humphrey, (McGraw-Hill, 1958), and Switching Circuits and Logical Design, Samuel H. Caldwell, (Wiley 1958) to construct the equipment specified.

BASIC CYCLE AND TYPICAL OPERATIONS

An understanding of the operating cycle of the computer of FIG. 2 will be facilitated by an analysis of the manner in which it performs typical operations such as add and multiply in comparison with the manner in which these operations are performed by the computer of FIG. 1. A significant fact to be remembered is that, although there are differences in both the memory access and the execution parts of their respective basic cycles, both equipments are operable by the same program.

Both machines are synchronous, i.e. they perform their their logical and arithmetic operations in a series of sequenced steps under the control of a system clock and timer which initiate, for example, gating levels $p$ and $t$ and timing pulses TF–1 – 8 as indicated in FIG. 1 and explained in more detail in U.S. patent application Ser. No. 755,565. This sequencing follows a repetitive pattern which comprises the basic cycle of the machine.

In both equipments the basic cycle involves two classes of operations—*memory access* wherein the instruction to be performed is extracted from memory and adjusted by appropriate indexing etc. to provide the necessary data for the operation, and *execution* wherein the operation desired is performed upon the data provided.

The following describes how both equipments perform the instruction: ADD THE NUMBER STORED IN THE MEMORY LOCATION SPECIFIED BY "*a*" TO THE NUMBER STORED IN THE "A" REGISTER.

Figure 3:
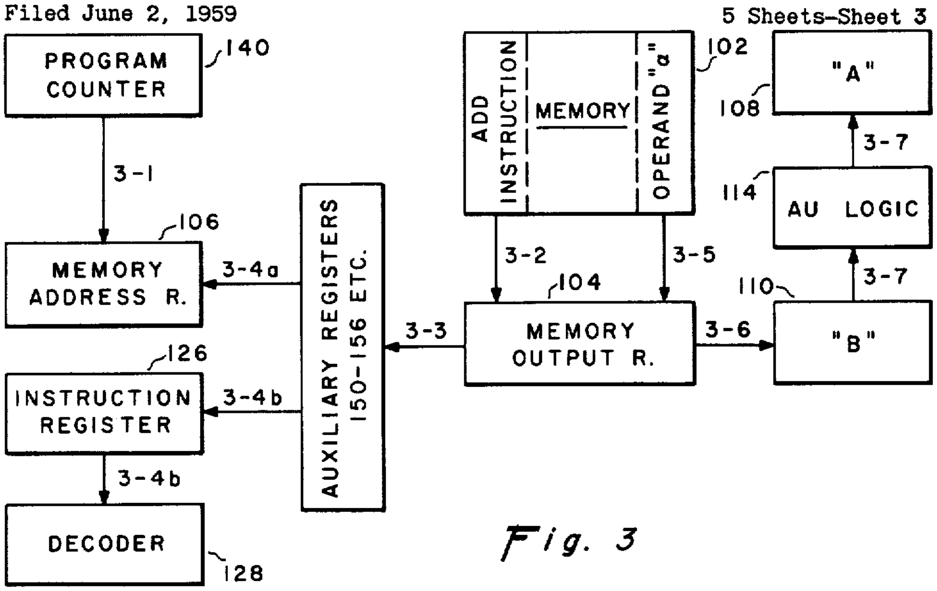
FIG. 3 is a combination block diagram and flow chart of the "add" operation in the computer of FIG. 1.

Computer of FIG. 1. (see FIG. 3):

*Memory Access*

3—1. Transfer the contents of the Program Counter to the Memory Address Register.

3—2. Transfer the contents of the memory address specified by the Program Counter from the Memory to the Memory Output Register.

3—3. Transfer the contents of the Memory Output Register to the various auxiliary registers for purposes of indexing, etc.

3—4A. Transfer the address of the operand "*a*" from the auxiliary registrs to the Memory Address Register.

3—4B. Transfer the instruction portion of the data word in the auxiliary registers to the Instruction Register, and thence to the Decoder.

*Execution*

3—5. Transfer the operand "*a*" from the Memory to the Memory Output Register.

3—6. Transfer the contents of the Memory Output Register to the "B" Register in the Arithmetic Unit.

3—7. Add the contents of the "B" Register to the contents of the "A" Register in the Arithmetic Unit.

Figure 4:
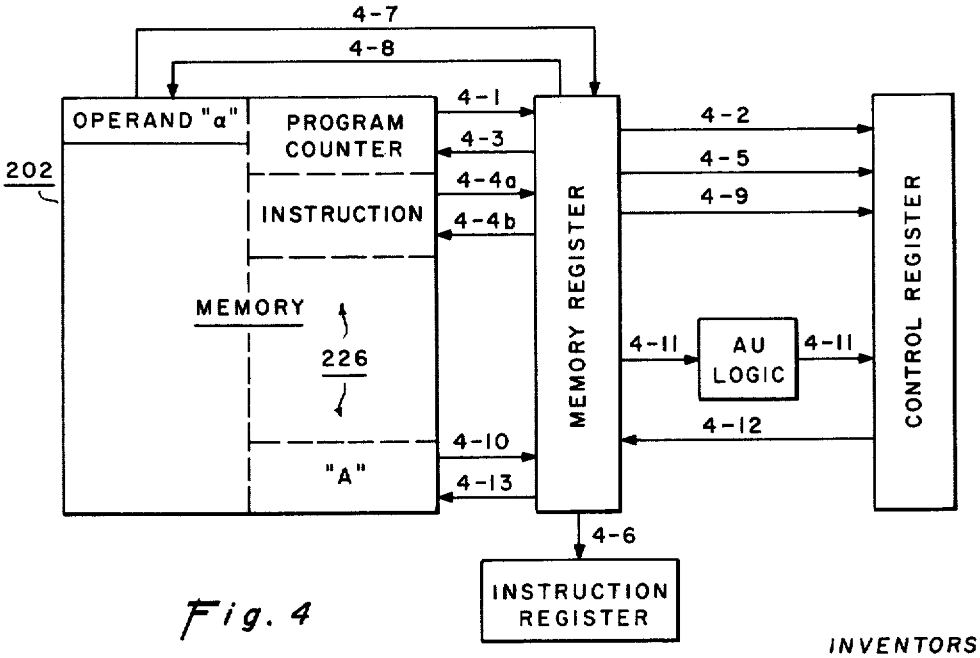
FIG. 4 is a similar representation of the "add" operation in the computer of FIG. 2.

Computer of FIG. 2 (see FIG. 4):

Copending Patent Application Ser. No. 755,565, previously identified, presents an illustrative example of this addition as performed by the computer of FIG. 1.

*Memory Access*

The basic cycle for this computer consists of two parts, a memory phase which obtains the pertinent instruction from memory, and an execution phase which performs the instruction indicated. In the sequence diagrammed in FIG. 4 and set forth below, steps 4–1 through 4–3 obtain and step the program counter. Steps 4–4 and 4–5 obtain and set up the instruction, and steps 4–6 through 4–11 execute the addition.

4—1. Transfer the contents of the Program Counter location (PC) in the Memory to the Memory Register.

4—2. Transfer the contents of the Memory Register to the Control Register.

4—3. Increase the contents of the Memory Register by one and return the result to the Program Counter location (PC) in the Memory.

4—4A. Transfer the contents of the memory location specified by the address bits (e.g. 1–12) of the Control Register (i.e. the instruction) from the Memory to the Memory Register.

4—4B. Return the contents of the Memory Register to the address in Memory from whence they were derived.

4—5. Transfer the contents of the Memory Register to the Control Register (If the instruction thus transferred from the Memory to the Control Register, via the Memory Register (4—4A, 4—4B, and 4—5, above) calls for indexing or subroutining this is now initiated by means of direct control wiring between the Control Register and the special locations concerned in area 226 of Memory 202.)

4—6. Transfer the instruction digits from the Memory Register to the Instruction Register.

*Execution*

4—7. Transfer the operand from the Memory location "*a*" (i.e. specified by the contents of the Control Register) to the Memory Register.

4—8. Rewrite the contents of the Memory Register into the Memory.

4—9. Transfer the contents of the Memory Register to the Control Register.

4—10. Transfer to the Memory Register the contents of the "A" Register location in the Memory.

4—11. Transfer the contents of the Memory Register (through the "AU" logic) to the Control Register.

4—12. Transfer the contents of the Control Register to the Memory Register.

4—13. Transfer the contents of the Memory Register to the "A" special address in the Memory.

The operation of the computer of FIG. 2 may be better understood from a detailed step-by-step description of how this typical addition instruction is obtained and executed, with reference to the timing cycle of the machine.

As explained previously, the basic timing of this machine is the same as that described in U.S. patent application Ser. No. 755,565 for the machine of FIG. 1. Thus, the central clock produces a series of one megacycle pulses which are converted to a series of $t$ pulses, occurring one every 2 microseconds, and a series of $p$ pulses also occurring one every 2 microseconds but 180° out of phase with the $t$ pulses. The complete memory cycle, i.e. a memory read-out followed by a write-in, takes 8 microseconds and the basic timing of machine operations is accomplished in 2 microsecond steps called timing functions. These steps are measured by the 2 microsecond interval between $t$ pulses. It will be appreciated that it takes four of these 2 microsecond intervals to complete one 8 microsecond memory cycle and that several memory cycles are necessary to obtain and execute each machine instruction.

For convenience of description the four timing functions required for each access to memory will be referred to as TF–1 – 4, and it will be understood that memory read-out is commenced during TF–1 while memory read-in is commenced during TF–3. Other operations may be commenced at the beginning or end, of TF–1 through 4, or they may be initiated by the $p$ pulses which occur at the midpoint of each timing function. Also, as explained in U.S. patent application Ser. No. 755,565, a $\lambda$ flip-flop may be employed to extend any one of the TF–1 – 4 periods to permit additional operations if desired.

Because the system organization of the computer of FIG. 2 requires many accesses to memory during the execution of an instruction, the memory cycle must be repeated several times. Consequently, to facilitate explanation, each complete memory cycle (TF-1–4) performed may be referred to as a timing interval (TI), and a number of such intervals is required to complete the instruction. The regeneration of the number of timing intervals required is accomplished by arranging for each TF-4 pulse to sequence another TF-1 pulse as long as the current instruction has not been completed. The normal number of timing intervals is eight (TF-1–8), but any given instruction may take a smaller, or larger, number.

The addition instruction previously outlined may be obtained and executed in accordance with the following timing sequence.

TI-1

TF-1. The Program Counter address in Memory 226 is automatically energized by Control Circuits 212 and its content is read into Memory Register 204. This takes from memory the address (in Memory 226) of the instruction to be presently performed.

TF-2. The content of Memory Register 204 is transferred from the Memory Register 204 to the Control Register 206 which performs the functions of an address register for Memory 226.

The content of Memory Register 204 is increased by a count of ONE, thereby indicating the address in Memory 226 of the next instruction to be performed.

TF-3. The Control Circuits 212 automatically disable the memory address capability of Control Register 206 and write the content of Memory Register 204 (currently the address of the next instruction) into the Program Counter address in Memory 226.

TF-4. The Memory Register 204 is cleared.

TI-2

TF-1. The memory address indicated by the content of Control Register 206 reads its content, i.e. the present Instruction Word from Memory 226 into Memory Register 204.

TF-2. The operation code bits (e.g. 31-36) of the Instruction Word are transferred from the Memory Register 204 to the Instruction Register 208.

TF-3. The content of the Memory Register 204 (i.e. the Instruction Word) is rewritten from the Memory Register 204 into the address of Memory 226 from which it was derived, this address still being held in Control Register 206 which serves as the memory address register.

TF-4. The content of the Memory Register 204 (the present Instruction Word) is transferred to the Control Register 206.

The Memory Register 204 is cleared.

Those bits of the Instruction Word (e.g. 28-30) which indicate whether an indexing operation is to be performed are sensed in the control register. If there is to be an indexing operation TI-3 is actuated by the Control Circuits 212 and the indicated Index subroutine is initiated. If there is to be no indexing operation, Control Circuits 212 commence the execution of the instruction (indicated by the Instruction Word in the Control Register 206) by initiating TI-4.

TI-3

Reserved for Indexing operations.

TI-4

Execution of the instruction (here, ADD THE NUMBER STORED IN MEMORY LOCATION "*d*" TO THE NUMBER STORED IN THE "A" REGISTER) is commenced.

TF-1. The content of the memory address (*a*) indicated by the Control Register 206 is read out of Memory 226 and into the Memory Register 204, thereby obtaining the operand of the instruction under execution.

TF-2. No significant operations are initiated.

TF-3. The content of the Memory Register 204 is rewritten back into address *a* of Memory 226.

TF-4. The content of the Memory Register 204 is transferred into the Control Register 206.

The Memory Register is then cleared.

TI-5

TF-1. The operation code bits in Instruction Register 208, as decoded by Decoder 210, energize the appropriate gates in Control Circuits 212 to read the content of the accumulator (address A) out of Memory 226 and into Memory Register 204.

TF-2. After appropriate sensing for identity of signs and complementing if they are different, etc. in the manner indicated in steps TF-3–5 of the addition execution explained in U.S. patent application Ser. No. 755,565, the contents of Memory Register 204 is accumulated into the content of the Control Register 206 by means of conventional carry chains and other arithmetic performing circuits in AU Logic **212*a* and the result is transferred into Memory Register 204**.

TF-3. The content of the Memory Register 204, i.e. the results of the previous accumulation, is written from the Memory Register 204 into the accumulator address ("A") of the Memory 226 to complete the instruction. The necessary memory addressing is accomplished by Control Circuit 212 under the control of the *op* code instruction in Instruction Register 208 as it is decoded by Decoder 210.

TF-4. Memory Register 204 is cleared, and the machine sequences initiation of the next instruction.

The instructions which the data processor of FIG. 2 is capable of performing are of two general types, direct and subroutined. Direct instructions are extracted, indexed, decoded, and executed directly, giving the same results as the instructions processed by the equipment of FIG. 1. Subroutined instructions are not executed directly by the hardware of the machine, but automatically cause control to be transferred to one of the special locations 226 in the Memory. The contents of this location thereupon initiate the desired subroutine, e.g. a square root, following a subroutine program stored in memory.

Indexing and subroutining are sequenced as follows:

*Indexing*

If an instruction in the computer of FIG. 2 is to be indexed, this requirement is indicated by appropriate content in index bits 28—30 of the instruction word transferred to the Control Register in sequence 4—5 above. Then, the contents of the special address in Memory allocated to the indexing indicated by the bits $CR_{28-30}$ are automatically read out of Memory into the Memory Register due to the logical mechanization of the machine, and are added to the instruction address before the execution cycle commences.

*Subroutines*

If the instruction to be executed is to follow a subroutine, the instruction word is derived from Memory and set up in the Control Register in accordance with sequences 4—1 through 4—5 above, whereupon the following sequence is automatically initiated:

(1) The instruction word is stored in one of the special locations 226 in Memory.

(2) The content of the Program Counter location in Memory is transferred, via the Memory Register, to another of the special locations in Memory.

(3) The content of the "A" Register location in Memory is transferred, via the Memory Register, to a third of the special locations in Memory.

(4) The contents of the Instruction Register generate an address in the Control Register which specifies the location in Memory of the first instruction of the subroutine.

(5) At the end of the subroutine, the previous contents of the "A" Register and Program Counter addresses are returned to their originally allocated special addresses in Memory, and control is transferred back to the Program Counter.

Figure 5:
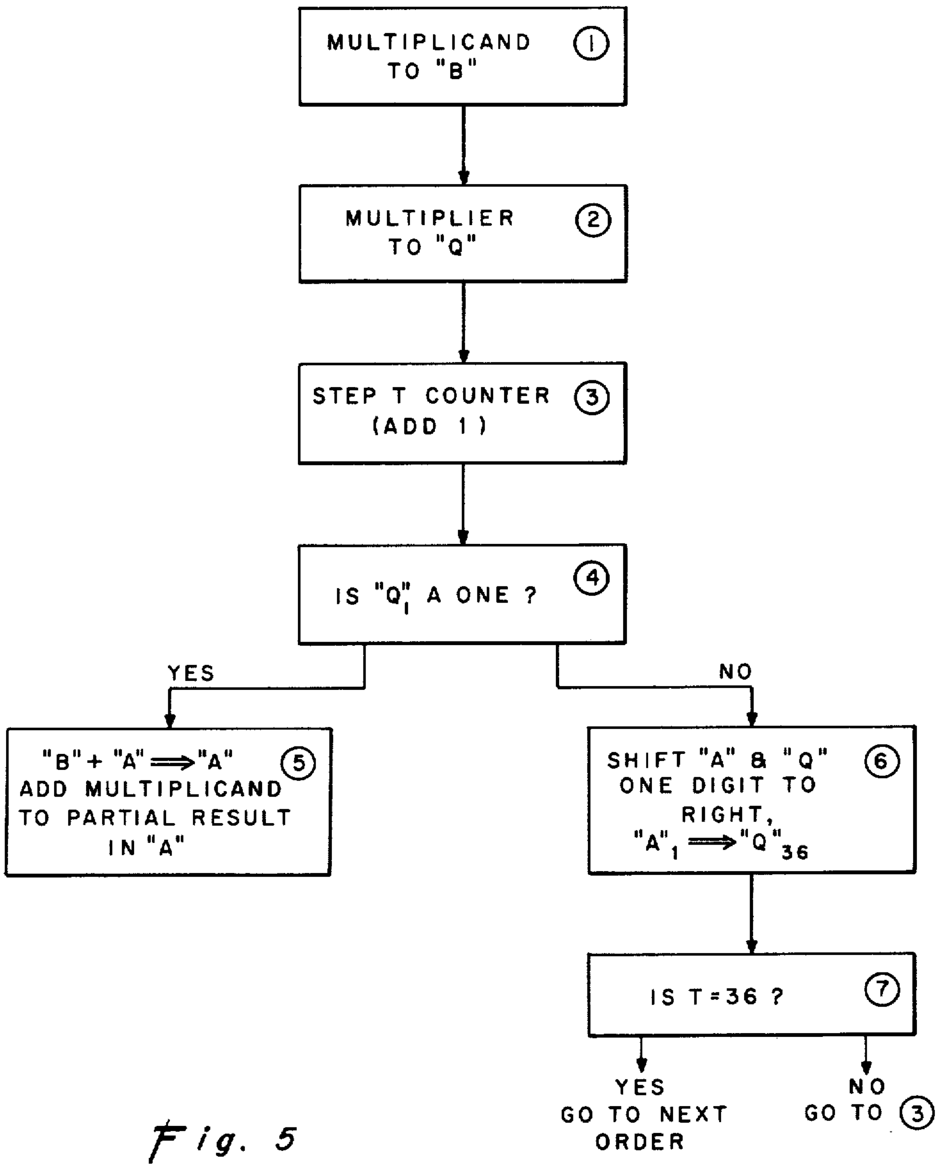
FIG. 5 is a flow diagram of the "multiply" operation in the computer of FIG. 1; and, FIG. 6 is a similar diagram of the "multiply" operation in the computer of FIG. 2.
Figure 6:
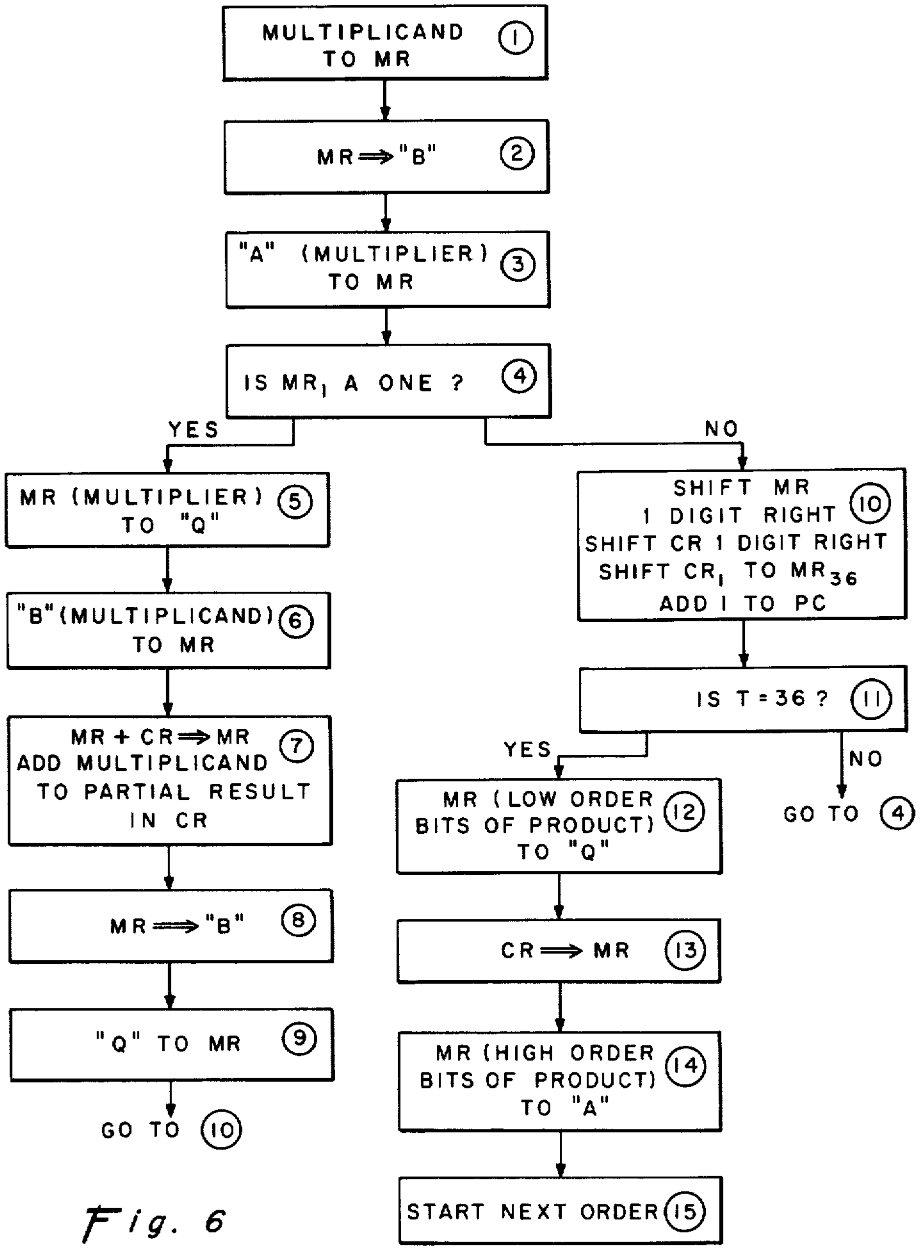

FIGS. 5 and 6 are flow diagrams of the multiplication operation in the processors of FIGS. 1 and 2, respectively. After the preceding descriptive comparison of the basic cycle of these two equipments and explanation of how addition is performed by both of them, a detailed explanation of how they perform multiplication and other arithmetic and logical operations is unnecessary for those skilled in the art and would unduly burden the present description. The multiplication flow charts are included to indicate a manner of approach. Specifics for this and other operations are a matter of routine programming.

The manner in which the machine of FIG. 1 performs multiplication is explained in general terms in U.S. patent application Ser. No. 755,565. Briefly, and referring to FIG. 5, the procedure is as follows:

(1) The multiplicand is transferred from memory to the "B" register in the Arithmetic Unit.

(2) The multiplier is transferred from memory to the "Q" register in the Arithmetic Unit.

(3) The T counter is set to a count of ONE. Its function will be to count the shift operations during the performance of the multiplication to insure that all of the possible digits, viz. 36, in the multiplier have an opportunity to be considered.

(4) The least significant bit position of the "Q" register is sensed to determine if it is a ONE or a ZERO.

(5) If the least significant bit in the "Q" register, i.e. of the multiplier, is a ONE, the multiplicand is added one time to the partial product in the "A" register of the Arithmetic Unit, i.e. the accumulator, and the contents of the "A" and "B" registers are shifted as in following step 6.

(6) If the least significant bit in the "Q" register is a ZERO, the contents of the "A" and "Q" registers are both shifted one digit to the right and the resulting overflow of low order bits from the "A" register are transferred into the high order locations of the "Q" register which are vacated in the shifting process. Thus, the "Q" register gives the "A" register a double length product handling capability.

(7) Steps 3–6 are repeated, with a consequent addition of the multiplicand into the accumulating product each time a ONE occupies the least significant bit position of the shifted multiplier, until the T counter indicates by a count of 36 that every possible data bit of the multiplier has entered into the computation. At this point the result in the accumulator, i.e. "A" register with overflow in "Q," is the product of the multiplication.

The machine of FIG. 2 performs a similar multiplication in the following manner (ref. FIG. 6):

(1) The multiplicand is transferred from Memory 226 to the Memory Register 204.

(2) The multiplicand is then transferred from the Memory Register 204 to the simulated "B" register location in Memory 226.

(2*a*) The contents of the simulated Program Counter address in the Memory 226 is transferred into the Memory Register 204 and then into the Program Counter Store location for use as a T counter which is stepped by an increment count of ONE for each shift operation of the multiplier.

(3) The multiplier is transferred from Memory 226 to the Memory Register 204.

(4) The least significant bit of the Memory Register 204 is sensed to determine whether it is a ONE or a ZERO.

(5) If the least significant bit of the multiplier in Memory Register 204 is a ONE, the contents of the Memory Register, i.e. the multiplier, is transferred to location "Q" in Memory 226.

(6) The multiplicand is transferred from location "B" in Memory 226 to the Memory Register 204.

(7) The multiplicand in the Memory Register 204 is accumulated into the partial product which is stored in the Control Register 206.

(8) The multiplicand is returned from the Memory Register 204 to the simulated "B" register address in the Memory 226.

(9) The content of the simulated "Q" register in Memory 226, i.e. the multiplier, is transferred to Memory Register 204.

(10) After step 9, or if the least significant bit of the multiplier sensed in step 4 is a ZERO instead of a ONE the following operations take place to consider the next most significant digit in the multiplier and handle the double length product problem. The multiplier in the Memory Register 204 and the partial product in the Control Register 206 are both shifted one digit to the right and the least significant digit of the Control Register is transferred to the most significant digit position of the Memory Register 204.

(11) If the T counter in the simulated Program Counter location of Memory 226 has not reached 36, the operating sequence reverts to step 4 and steps 4–10 are repeated until a T count of 36 (the number of possible digits in the multiplier) is achieved.

(12) When the T count equals 36, the contents of the Memory Register 204 which corresponds to the low order bits of the product are transferred to the simulated "Q" register location of Memory 226.

(13) The high order bits of the product are transferred from the Control Register 206 to the Memory Register 204.

(14) The high order bits of the product are transferred from the Memory Register 204 to the simulated "A" register location in the Memory 226. This completes the multiplication routine with the product found in the combination of "A" and "Q" memory locations.

The invention is not limited to the particular illustrative examples shown and described but encompasses the full scope of the following claims.

What is claimed is:

1. In a data processing system which includes a memory unit having a plurality of random access data word storage addresses, a memory register in parallel data word transfer connection with the individual addresses of said memory, a control register in parallel data word transfer connection with said memory register, and an instruction register, a control system which comprises: means for causing program counting data to be transferred from a given one of said memory addresses to said memory register; circuit means connected between said control register and said memory and arranged to connect selected individual addresses of said memory to said memory register in data transfer relationship as indicated by the data content of said control register; means for transferring data words between said memory register and said control register arithmetic logic control circuitry connected between said memory register and said control register and arranged to perform arithmetic operations upon data transferred between said memory register and said control register; and, means for determining said arithmetic operations by the data content of said instruction register.

2. In a data processing system which includes a memory unit having a plurality of random access data word storage addresses, a memory register in parallel data word transfer connection with the individual addresses of said memory; a control register in parallel data word transfer connection with said memory register, and an instruction register, a control system which comprises: means for causing program counting data to be transferred from a given one of said memory addresses to said memory register; circuit means connected between said control register and said memory and arranged to connect individual addresses of said memory to said memory register in data transfer relationship as indicated by the data content of said control register; means for transferring said data word between said memory and control registers; arithmetic logic control circuitry connected between said memory register and said control register and arranged to perform arithmetic operations upon data transferred between said memory register and said control register; means for determining said arithmetic operations by the data content of said instruction register; and additional means independent of the data content of said control register for connecting selected ones of said memory addresses and said memory register in data transfer relationship.

3. In an electronic data processing system having a multi-address random access memory, a memory register, and a control register, a control system comprising: a first means for connecting said memory register and individual ones of said addresses of said memory in data transfer relationship which includes decoder means under control of the data content of said control register; and, a second means for so connecting certain individual ones of said addresses and said memory register including a decoder independent of the data content of said control register.

4. An electronic computer having a multi-address, random access, memory unit, a memory register, a control register, an instruction register, an arithmetic logic control system, and a general control system, for performing addition of data stored in a first memory address to data stored in a second memory address in accordance with an instruction stored in a third memory address and in response to a program controlled by the contents of a fourth memory address, said control system comprising: means for transferring an indication of the status of said program comprising an identification of said third address from said fourth memory address to said memory register; means for transferring data identifying said third address from said memory register to said control register; means for adjusting the content of said memory register to identify the address of the next sequential instruction in said program and transferring said adjusted content to said fourth address; means for transferring an indication of said first-mentioned instruction from said third address as determined by the contents of said control register from said third address to said memory register; means for transferring an identification of said first address from said memory register to said control register and an indication of the operation to be performed from said memory register to said instruction register; means for transferring the contents of said first address as specified by the contents of the control register from memory to the memory register; means for transferring the contents of the memory register to the control register; means for transferring the contents of said second address to the memory register; and, means for combining the contents of said memory and control registers in accordance with control by said arithmetic logic system as determined by the data content of said instruction register.

References Cited in the file of this patent

UNITED STATES PATENTS

| | | |
|---|---|---|
| 2,877,446 | Sublette et al. | Mar. 10, 1959 |
| 2,914,248 | Ross et al. | Nov. 24, 1959 |

FOREIGN PATENTS

| | | |
|---|---|---|
| 792,707 | Great Britain | Apr. 2, 1958 |

OTHER REFERENCES

"Organizing a Network of Computers," NBS Technical News Bulletin, Feb. 1959, pp. 26, 27 & 28.

Computer Development (SEAC & DYSEAC) at the National Bureau of Standards, N.B.S. Circular 551, pp. 39, 40, Jan. 25, 1955.

A Functional Description of the EDVAC, vol. 1, pp. 4–1 to 4–3, published by the University of Penn., Moore School of Electrical Engineering, Philadelphia, Penn. Nov. 1, 1949.

Astrahan et al., "Logical Design at the Digital Computer for the SAGE System," IBM Journal of Research and Development vol. 1, No. 1, pp. 76 to 83, Jan., 1957.

Doyle et al., "Automatic Failure Recovery in a Digital Data Processing System," IBM Journal of Research and Development, vol. 3, No. 1, pp. 2 to 12, Jan., 1959.